US008095075B2

(12) United States Patent
Vadlamudi

(10) Patent No.: US 8,095,075 B2
(45) Date of Patent: Jan. 10, 2012

(54) SYSTEM AND METHOD OF DETECTING A SLEEPING CELL AND REMEDYING DETECTED CONDITIONS IN A TELECOMMUNICATION NETWORK

(75) Inventor: Sridhar Vadlamudi, Frisco, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 275 days.

(21) Appl. No.: 12/472,128

(22) Filed: May 26, 2009

(65) Prior Publication Data
US 2010/0234006 A1 Sep. 16, 2010

Related U.S. Application Data

(60) Provisional application No. 61/158,844, filed on Mar. 10, 2009.

(51) Int. Cl.
*H04B 17/00* (2006.01)
(52) U.S. Cl. ............ 455/67.11; 455/561; 455/423; 455/446; 455/453; 455/452.2
(58) Field of Classification Search .......... 455/423, 455/450, 452.1–452.2, 453, 509, 455, 515, 455/67.11, 63.1, 446, 561
See application file for complete search history.

(56) References Cited

U.S. PATENT DOCUMENTS

| 5,859,838 | A | * | 1/1999 | Soliman | 370/249 |
|---|---|---|---|---|---|
| 6,088,588 | A | * | 7/2000 | Osborne | 455/425 |
| 6,256,490 | B1 | * | 7/2001 | Yost et al. | 455/405 |
| 6,445,917 | B1 | * | 9/2002 | Bark et al. | 455/423 |
| 6,766,165 | B2 | * | 7/2004 | Sharma et al. | 455/423 |
| 6,961,570 | B2 | * | 11/2005 | Kuo et al. | 455/436 |
| 7,003,290 | B1 | * | 2/2006 | Salonaho et al. | 455/423 |
| 7,499,700 | B2 | * | 3/2009 | Dillon et al. | 455/423 |
| 7,613,473 | B2 | * | 11/2009 | Yi et al. | 455/518 |
| 2001/0031626 | A1 | * | 10/2001 | Lindskog et al. | 455/67.3 |
| 2004/0087340 | A1 | * | 5/2004 | Cao et al. | 455/560 |
| 2004/0097237 | A1 | * | 5/2004 | Aoyama | 455/445 |
| 2004/0152362 | A1 | * | 8/2004 | Carter et al. | 439/660 |
| 2005/0042987 | A1 | * | 2/2005 | Lee et al. | 455/67.11 |
| 2006/0063521 | A1 | * | 3/2006 | Cheung et al. | 455/423 |
| 2007/0149134 | A1 | * | 6/2007 | Sebire et al. | 455/67.11 |

* cited by examiner

*Primary Examiner* — Nick Corsaro
*Assistant Examiner* — Babar Sarwar

(57) ABSTRACT

A node in a telecommunications network having a number of cells is informed of a sleeping cell. Within the telecommunications network, information of a potential sleeping cell detected by a user equipment (UE) operating in the telecommunications network is sent to the node. The UE may determine that the cell is a potential sleeping cell upon failing to receive a response from the cell after a specified number of Radio Resource Control attempts. The node determines whether the potential sleeping cell is a sleeping cell. A status of the sleeping cell is confirmed as an actual sleeping cell in the network, and the node sends an alarm alerting the network of the sleeping cell. A self-healing action may be automatically performed on the sleeping cell.

15 Claims, 2 Drawing Sheets

SYSTEM AND METHOD OF DETECTING A SLEEPING CELL AND REMEDYING DETECTED CONDITIONS IN A TELECOMMUNICATION NETWORK

CROSS-REFERENCE TO RELATED APPLICATIONS

This application claims the benefit of U.S. Provisional Application No. 61/158,844, filed Mar. 10, 2009, the disclosure of which is incorporated herein by reference.

BACKGROUND

The present invention relates to communications networks. More particularly, and not by way of limitation, the present invention is directed to a system and method of detecting a sleeping cell in a telecommunications network (GSM, CDMA, UMTS or LTE technologies). As an example, UMTS system has been used. The same principle can be extrapolated to other technologies (GSM, CDMA or LTE). In the current Universal Mobile Terrestrial System (UMTS) network, there are cells that do not setup traffic and have no alarms alerting the operator of the degraded situation. FIG. 1 illustrates a simplified block diagram of a UMTS network 100 that comprises a 3G network referred to as a core network 102 and a UMTS Terrestrial Radio Access Network (UTRAN) 104. The UTRAN comprises a plurality of Radio Networks Controllers (RNCs) 106. There is a plurality of RNCs performing various roles. Each RNC is connected to a set of base stations. A base station is often called a Node-B. A base station typically has three sectors (also referred to as cells in UMTS). Each Node-B 108 is responsible for communication with one or more User Equipments (UEs) 110 within a given geographical cell 112. The serving RNC is responsible for routing user and signaling data between a Node-B and the core network.

A Sleeping cell is an unlocked cell that is transmitting on the broadcast channel which has no alarms and is unable to setup traffic (packet or voice calls). Currently, there are no methods or systems for detecting sleeping cells in a telecommunications network.

SUMMARY

The present invention detects a sleeping cell in a telecommunications network, confirms the status of the sleeping cell is actually a sleeping cell, and optionally performs self-help actions on the sleeping cell.

In one aspect, the present invention is directed at a method of detecting a sleeping cell in a telecommunications network having a plurality of cells. The method includes the step of informing a node within the telecommunications network of information of a potentially sleeping cell by a user equipment (UE) operating in the telecommunications network. The UE may determine that the cell is a potentially sleeping cell upon failing to receive a response from the cell after a specified number of Radio Resource Control (RRC) attempts. The method also includes the step of determining by the node that the potentially sleeping cell is a sleeping cell. The method further confirms a status of the sleeping cell as an actual sleeping cell in the network, and upon positively confirming the status of the sleeping cell as a sleeping cell, sends an alarm alerting the network of the sleeping cell. A self-healing action may be optionally performed on the sleeping cell.

In another aspect, the present invention is directed at a system for detecting a sleeping cell in a telecommunications network. The system includes a UE operating in the telecommunications network, a node within the telecommunications network, and a plurality of cells within the telecommunications network. The UE informs the node of information of a potentially sleeping cell. The node determines if the potentially sleeping cell is a sleeping cell and confirms a status of the sleeping cell as an actual sleeping cell in the network. Upon positively confirming the status of the sleeping cell as a sleeping cell, an alarm is sent alerting the network of the sleeping cell.

In still another aspect, the present invention is directed at a node for detecting a sleeping cell in a telecommunications network having a plurality of cells. The node receives information of a potentially sleeping cell from a UE operating in the telecommunications network. The node determines if the potentially sleeping cell is a sleeping cell and confirms a status of the sleeping cell as an actual sleeping cell in the network. The node also sends an alarm alerting the network of the sleeping cell upon positively confirming the status of the sleeping cell as a sleeping cell.

BRIEF DESCRIPTION OF THE DRAWINGS

In the following section, the invention will be described with reference to exemplary embodiments illustrated in the figures, in which.

DETAILED DESCRIPTION

Figure 1:
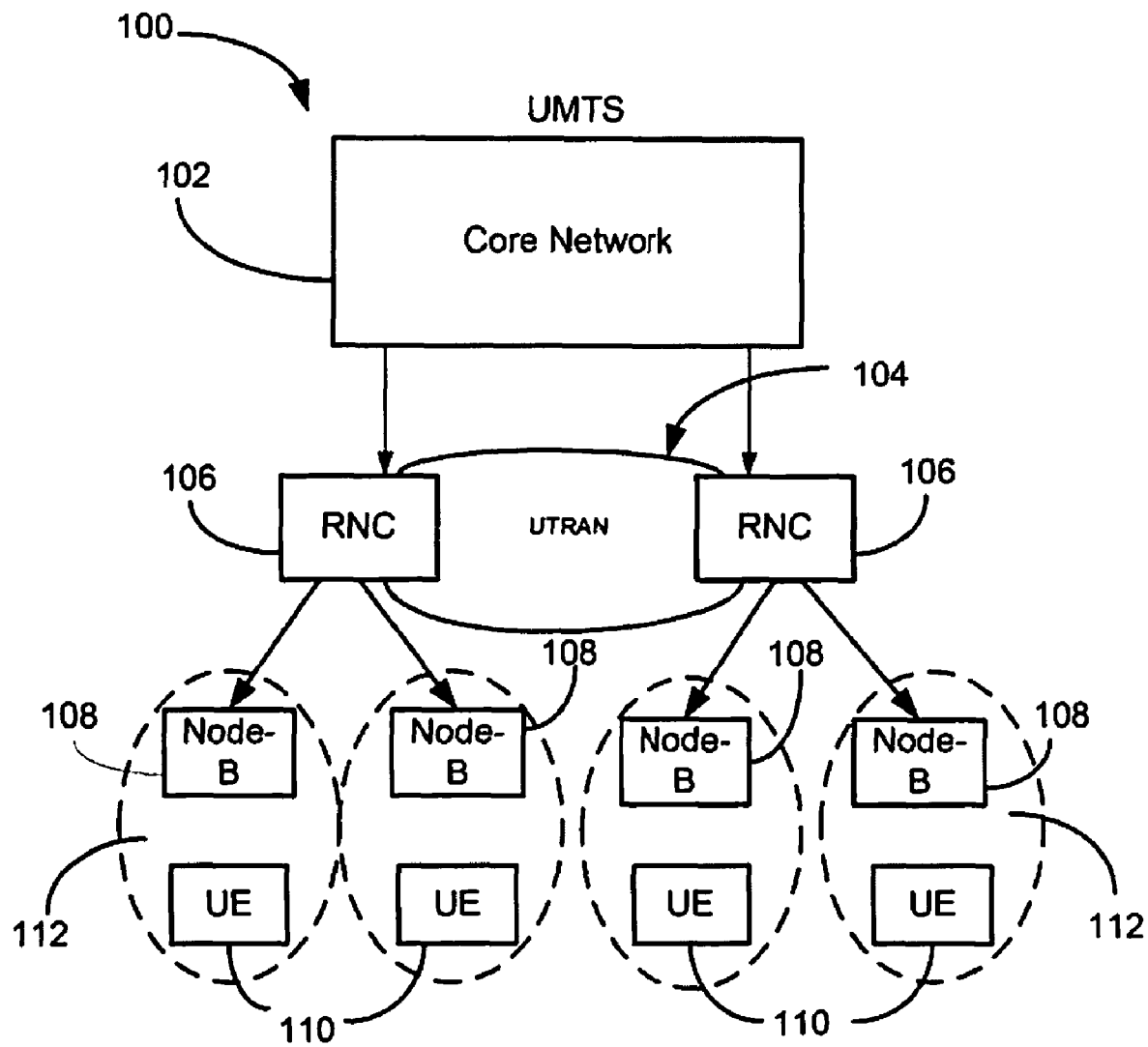
FIG. 1 (prior art) illustrates a simplified block diagram of an existing UMTS network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method of detecting a sleeping cell in a telecommunications network. As noted earlier, each base station in the network typically has 3 cells/sector and one of these 3 cells could be sleeping. There are two types of sleeping cells which exist in UMTS networks. First, there are cells that accept Radio Resource Control (RRC)-Connection-Request messages on a Random Access Channel (RACH) channel (Uplink), but do not transmit RRC-Connection-Setup messages on a downlink channel, such as a Fast Access Channel (FACH). These cells are termed Partial Sleeping Cells (PS-Cell). Second, there are cells that do not accept the RRC-Connection-Request message, though the cells are detected by the User Equipment (UE). These cells are termed as Total Sleeping cells (TS-Cell). The present invention provides a method for detecting both of these types of sleeping cells. Additionally, the present invention confirms that the cells are sleeping and optionally provides self-healing actions for fixing the cells.

For TS-Cell detection where no RRC attempts are received by the nodeB (RBS), the UE preferably performs several criteria checks. First, it is determined if the UE is able to decode the Broadcast channel. Second, it is determined if at least a specified number of RRC attempts (e.g., five attempts) have failed without a response. In this case, an RRC-Reject message is counted as a response. If the above two criteria are met, then the UE preferably stores specific information for transmittal to the RNC. The information may include Cell Identification (ID) of the sleeping cell, a Primary Scrambling Code (PSC) of the sleeping cell, a time stamp of the occurrence (i.e., time when the sleeping cell is discovered), and the time zone of the timestamp. The UE holds this information until it moves to a non-sleeping cell. At this point, the RNC is informed about the sleeping cell in the RRC-Connection-Setup-Complete message sent by the UE. The sleeping cell information may then become a part of a new optional Information Element (IE) group in an RRC-Connection-Setup-Complete message sent by the UE. Table 1 below illustrates the new information element in an RRC-Connection-Setup-Complete message.

TABLE 1

| Information Element/Group name | Need | Multi | Comment |
|---|---|---|---|
| Sleeping Cell | | 1 to MaxCells | |
| >Cell-ID | Mandatory | | |
| >PSC | Mandatory | | Primary Scrambling Code |
| >Timestamp | Mandatory | | |
| >Timezone | Mandatory | | |

Upon receipt by the RNC of a RRC-Connection-Setup-Complete message with the sleeping cell information, the RNC may check the time stamp and convert the time to its time zone. If the time stamp is within 48 hrs period, the RNC may consider this as a detected Total Sleeping Cell and may further confirm that the cell is indeed sleeping.

For PS-cell detection, the above method of detection of a total sleeping cell may also be used. For PS-cell detection, several performance counters in the RNC may also be utilized. A Counter for RRC-Connection-Request attempts (called Counter.RRC-Attempt), and a Counter for RRC-Connection-Request success (called Counter.RRC-Success) may be used. If a specified number of RRC-Connection-Request attempts are made without success (e.g., Counter.RRC-Attempt>15 and Counter.RRC-Success=0), then the RNC may determine that the reported cell is a PS-Cell and confirm that the cell is a PS-Cell.

Thus, after the RNC determines that a sleeping cell (either a PS-Cell or a TS-Cell) is detected, the present invention confirms the status of the cell as a sleeping cell prior to conducting a self-healing action. For a PS-Cell, once the UE has detected a PS-cell utilizing the counters methodology discussed above, the RNC confirms the status of the detected PS-Cell by confirming that there are no existing Key Performance Indicator (KPI) degradation alarms. In addition, the RNC preferably confirms that the cell is unlocked and is shown as enabled and ready for service. If both these criteria are confirmed, the RNC confirms that the cell is sleeping and may then raise an alarm and optionally perform self-healing actions.

For a TS-Cell, once a TS-Cell has been detected by the UE, the RNC may perform the following confirmation actions. The RNC may confirm that more than a predetermined number of UEs (e.g., ten UEs) have flagged the cell as a TS-Cell in a predetermined time period, such as 48 hours. In addition, the RNC confirms that no self-healing action has taken by the RNC after the timestamp. The RNC also confirms that there are no existing KPI degradation alarms. The RNC also confirms that the cell is unlocked and is shown as enabled and ready for service. If the RNC confirms the above criteria, the RNC may then either raise an alarm or perform self-healing actions.

As discussed above, once the Sleeping cell (TS-Cell or PS-Cell) has been confirmed, the RNC may raise an alarm only or raise an alarm and also conduct one or more self-healing actions. Self-healing actions may be initiated after a predetermined period of time after raising the alarm, such as one hour. The self-healing may include one or more of the following actions: the sleeping cell may be locked and unlocked; if the cell reappears as a sleeping cell within a predetermined time period, such as two hours, then further self-healing actions may take place, such as restarting a Radio Base Station (RBS) with a latest saved configuration and if the cell reappears as a sleeping cell within a specified time period, such as 24 hours, then further self-healing actions may be conducted, such as locking the cell and stopping the broadcast channel of the cell.

Figure 2:
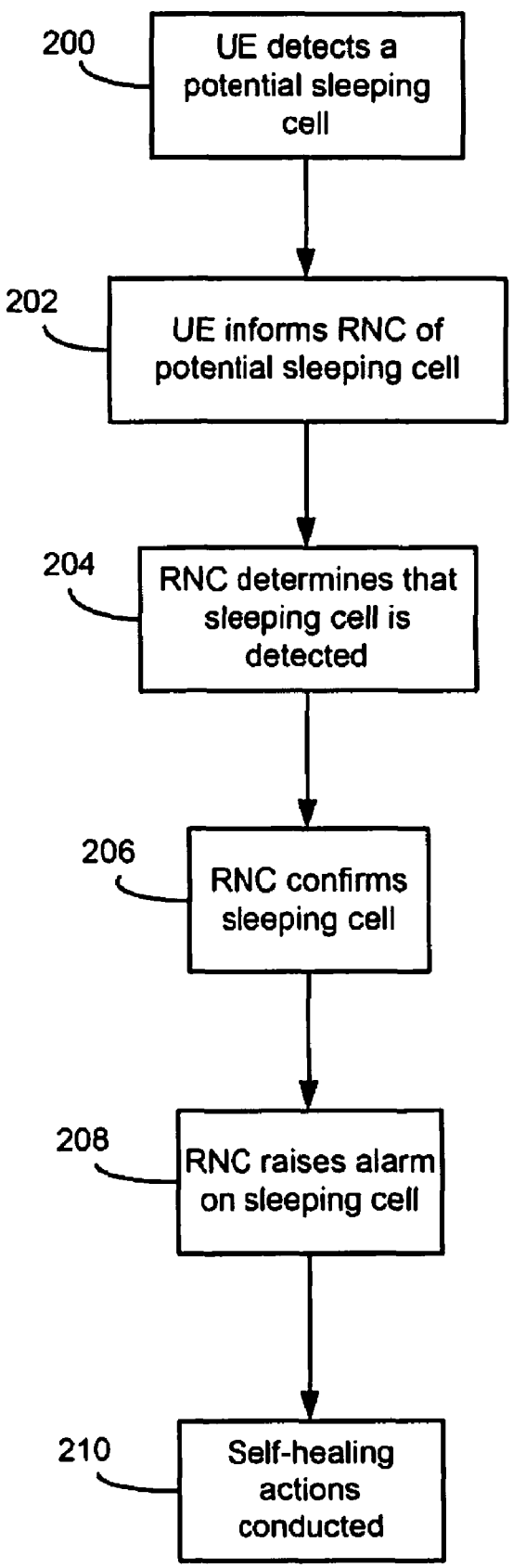
FIG. 2 is a flow chart illustrating the steps of detecting and optionally performing self-healing actions on a sleeping cell according to one embodiment of the present invention.

FIG. 2 is a flow chart illustrating the steps of detecting and optionally performing self-healing actions on a sleeping cell according to one embodiment of the present invention. With reference to FIGS. 1 and 2, the steps of the method will now be explained. The method begins in step 200 where a UE detects an existence of a potentially sleeping cell. When the nodeB (RBS) does not detect any RRC attempts, the UE preferably performs several criteria checks. First, it is determined if the UE is able to decode the Broadcast channel. Second, at least a specified number of RRC attempts (e.g., five attempts) have failed without a response. In this case, an RRC-Reject message is counted as a response. If the above two criteria are met, then the UE preferably stores specific information for transmittal to the RNC (step 202). The information may include Cell Identification (ID) of the sleeping cell, a Primary Scrambling Code (PSC) of the sleeping cell, a time stamp of the occurrence (i.e., time when the sleeping cell is discovered), and the time zone of the timestamp. The UE holds this information until it moves to a non-sleeping cell.

Next, in step 202, the UE informs the RNC about the potential sleeping cell by sending a RRC-Connection-Setup-Complete message to the RNC. The sleeping cell information may then become a part of a new optional Information Element (IE) group in an RRC-Connection-Setup-Complete message sent by the UE. Upon receipt by the RNC of a RRC-Connection-Setup-Complete message with the sleeping cell information, the RNC may determine if the potential sleeping cell is indeed a detected sleeping cell in step 204. The RNC may check the time stamp and convert the time to its time zone. For PS-Cell detection, several performance counters in the RNC may be utilized. A Counter for RRC-Connection-Request attempts (called Counter.RRC-Attempt), and a Counter for RRC-Connection-Request success (called Counter.RRC-Success) may be used. If a specified number of RRC-Connection-Request attempts are made without success (e.g., Counter.RRC-Attempt>15 and Counter.RRC-Success=0), then the RNC may determine that the reported cell is a detected PS-Cell. For a TS-Cell, upon receipt of the information from the UE that the RRC attempts exceeded a specified number (e.g., five requests), the RNC may determine that the cell is a detected TS-Cell.

In step 206, after the RNC determines that a sleeping cell (either a PS-Cell or a TS-Cell) is detected, the RNC confirms the status of the cell as an actual sleeping cell prior to conducting a self-healing action. For a PS-Cell, once the UE has detected a PS-cell using the counters method, the RNC confirms the status of the detected PS-Cell by confirming that there are no existing Key Performance Indicator (KPI) degradation alarms. In addition, the RNC preferably confirms that the cell is unlocked and is shown as enabled and ready for service. For a TS-Cell, once a TS-Cell has been detected by the UE, the RNC may perform the following confirmation actions. The RNC may confirm that more than a predetermined number of UEs (e.g., ten UEs) have flagged the cell as a TS-Cell in a predetermined time period, such as 48 hours. In addition, the RNC confirms that no self-healing action has been taken by the RNC after the timestamp. The RNC also confirms that there are no existing KPI degradation alarms. The RNC also confirms that the cell is unlocked and is shown as enabled and ready for service. If the RNC confirms the above criteria, the RNC may then either raise an alarm or perform self-healing actions.

Once the Sleeping cell (TS-Cell or PS-Cell) has been confirmed, the RNC may raise an alarm in step 208. Next, in step 210, the RNC may optionally initiate self-healing actions on the sleeping cell. Self-healing actions may be initiated after a predetermined period of time after raising the alarm, such as one hour. The self-healing may include one or more of the following actions. The sleeping cell may be locked and unlocked. If the cell reappears as a sleeping cell within a predetermined time period, such as two hours, then further self-healing actions may take place, such as restarting a Radio Base Station (RBS) with a latest saved configuration. If the cell reappears as a sleeping cell within a specified time period, such as 24 hours, then further self-healing actions may be conducted, such as locking the cell and stopping the broadcast channel of the cell.

Although the present invention is discussed in terms of a UMTS network, the present invention may be implemented in any network. For example, in Long Term Evolution (LTE), a Mobility Management Entity (MME) may be utilized to perform the functions of the RNC.

The present invention provides several advantages for existing telecommunications systems. The present invention proactively detects sleeping cells, confirms the existence of the sleeping cells and attempts to resolve the sleeping cell problems, thereby enhancing performance of the network.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method, in a telecommunication network, of detecting and correcting a sleeping cell, the method comprising the steps of:
   receiving by a Radio Network Controller (RNC) within the telecommunication network, a message from a User Equipment (UE) identifying a cell that is transmitting on a broadcast channel, but lacks alarms and is unable to set up traffic;
   the RNC confirming that the cell is a sleeping cell; and
   upon confirming that the cell is a sleeping cell, the RNC performing the steps of:
   sending an alarm to alert the network of the sleeping cell; and
   attempting to awaken the sleeping cell by:
      automatically locking and unlocking the sleeping cell and thereafter monitoring the cell's performance;
      if the cell reappears as a sleeping cell within a first predetermined time period, restarting a radio base station in the cell with a saved configuration and thereafter monitoring the cell's performance; and
      if the cell again reappears as a sleeping cell within a second predetermined time period, locking the cell and stopping the broadcast channel of the cell.

2. The method according to claim 1, wherein the step of the RNC receiving the message occurs when the UE does not detect any response from the radio base station in response to at least one radio resource control (RRC) request attempt transmitted to the radio base station by the UE, wherein the cell is considered a total sleeping cell.

3. The method according to claim 2, wherein the step of the RNC receiving the message occurs when the UE does not detect any response from the radio base station in response to a specified number of radio resource control (RRC) request attempts, and the receiving step further comprises:
   receiving the number of RRC request attempts from the UE in an Information Element (IE) in an RRC-Connection-Setup-Complete message.

4. The method according to claim 3, wherein the step of confirming that the cell is a sleeping cell includes utilizing a first counter to count the number of RRC-Connection-Request attempts and a second counter to count a number of RRC-Connection-Request successes.

5. The method according to claim 4, wherein the step of confirming that the cell is a sleeping cell also includes determining by the RNC that the cell is a partially sleeping cell if the first counter counts over a specified number of RRC-Connection-Request attempts and the second counter does not count any successes.

6. The method according to claim 3, wherein the specified number of RRC-Connection-Request attempts is fifteen.

7. The method according to claim 1 wherein the step of confirming that the cell is a sleeping cell includes determining whether the sleeping cell is a partially sleeping cell or a total sleeping cell.

8. The method according to claim 7, wherein the RNC determines that the sleeping cell is a partially sleeping cell when a Key Performance Indicator degradation alarm does not exist and the cell is unlocked and enabled.

9. The method according to claim 7, wherein the RNC determines that the sleeping cell is a totally sleeping cell by:
   confirming that a specified number of UEs have flagged the sleeping cell as a sleeping cell in a specified time period;
   confirming that no self-healing action has been performed on the sleeping cell;
   confirming that no Key Performance Indicator degradation alarm exists for the cell; and
   confirming that the cell is unlocked and enabled.

10. An apparatus in a Radio Network Controller (RNC) for detecting and correcting a sleeping cell in a telecommunication network, the apparatus comprising:
   means for connecting to a user equipment (UE) operating in the telecommunication network, the connecting means for receiving information from the UE of a cell that is transmitting on a broadcast channel, but lacks alarms and is unable to set up traffic;
   wherein the apparatus is configured to:
   confirm that the cell is a sleeping cell; and
   upon confirming that the cell is a sleeping cell, send an alarm to alert the network of the sleeping cell and attempt to awaken the sleeping cell;
   wherein the apparatus attempts to awaken the sleeping cell by:
      automatically locking and unlocking the sleeping cell and thereafter monitoring the cell's performance;
      if the cell reappears as a sleeping cell within a first predetermined time period, restarting a radio base station in the cell with a saved configuration and thereafter monitoring the cell's performance; and if the cell again reappears as a sleeping cell within a second predetermined time period, locking the cell and stopping the broadcast channel of the cell.

11. The apparatus according to claim 10, wherein the connecting means is adapted to receive a message from the UE confirming that the cell does not respond to at least a specified number of radio resource control (RRC) request attempts.

12. The apparatus according to claim 11, wherein the specified number of RRC request attempts is received in an Information Element (IE) in and RRC-Connection-Setup-Complete message.

13. The apparatus according to claim 11, wherein the apparatus is configured to confirm that the cell is a sleeping cell by utilizing a first counter to count a number of RRC-Connection Request attempts, and a second counter to count a number of RRC-Connection-Request successes.

14. The apparatus according to claim 13, wherein the apparatus is configured to determine that the cell is a partially sleeping cell when the first counter counts more than a specified number of RRC-Connection-Request attempts and the second counter does not count any successes.

15. The apparatus according to claim 10, wherein the apparatus is configured to determine whether the sleeping cell is a partially sleeping cell or a total sleeping cell.

* * * * *

UNITED STATES PATENT AND TRADEMARK OFFICE
CERTIFICATE OF CORRECTION

| | | |
|---|---|---|
| PATENT NO. | : 8,095,075 B2 | Page 1 of 1 |
| APPLICATION NO. | : 12/472128 | |
| DATED | : January 10, 2012 | |
| INVENTOR(S) | : Vadlamudi | |

It is certified that error appears in the above-identified patent and that said Letters Patent is hereby corrected as shown below:

IN THE CLAIMS:

In Column 7, Line 12, in Claim 12, delete "and" and insert -- an --, therefor.

Signed and Sealed this
Twenty-ninth Day of May, 2012

David J. Kappos
*Director of the United States Patent and Trademark Office*